US007739736B1

(12) United States Patent
Tripathi et al.

(10) Patent No.: US 7,739,736 B1
(45) Date of Patent: Jun. 15, 2010

(54) METHOD AND APPARATUS FOR DYNAMICALLY ISOLATING AFFECTED SERVICES UNDER DENIAL OF SERVICE ATTACK

(75) Inventors: Sunay Tripathi, San Jose, CA (US); Nicolas G. Droux, San Jose, CA (US); Yuzo Watanabe, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1454 days.

(21) Appl. No.: 11/112,158

(22) Filed: Apr. 22, 2005

(51) Int. Cl.
G06F 9/00 (2006.01)
G06F 11/00 (2006.01)
H04L 29/06 (2006.01)

(52) U.S. Cl. ............................. 726/22; 726/11; 726/13; 713/152

(58) Field of Classification Search ......... 713/150–154; 726/11–16, 23
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,389,031 B1 * | 5/2002 | Chao et al. | 370/412 |
| 6,477,643 B1 | 11/2002 | Vorbach et al. | |
| 6,584,111 B1 * | 6/2003 | Aweya et al. | 370/412 |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,829,217 B1 * | 12/2004 | Bechtolsheim et al. | 370/229 |
| 6,829,649 B1 * | 12/2004 | Shorey et al. | 709/235 |
| 6,831,893 B1 | 12/2004 | Ben Nun et al. | |
| 6,859,841 B2 | 2/2005 | Narad et al. | |
| 6,862,265 B1 * | 3/2005 | Appala et al. | 370/235 |
| 6,944,168 B2 | 9/2005 | Paatela et al. | |
| 7,006,440 B2 * | 2/2006 | Agrawal et al. | 370/235 |
| 7,046,665 B1 | 5/2006 | Walrand et al. | |
| 7,092,357 B1 * | 8/2006 | Ye | 370/230 |
| 7,146,431 B2 | 12/2006 | Hipp et al. | |
| 7,177,311 B1 | 2/2007 | Hussain et al. | |

(Continued)

OTHER PUBLICATIONS

U.S. Appl. No. 60/590,450.*

(Continued)

*Primary Examiner*—Kimyen Vu
*Assistant Examiner*—Darren Schwartz
(74) *Attorney, Agent, or Firm*—Osha • Liang LLP

(57) ABSTRACT

A method for controlling consumption of resources by a packet destination involves receiving a plurality of packets from a network, identifying the packet destination consuming greater than a pre-determined amount of resources to process the plurality of packets, analyzing each of the plurality of packets by a classifier to determine to which of a plurality of temporary data structures each of the plurality of packet is forwarded, forwarding each of the plurality of packets to one of the plurality of temporary data structures as determined by the classifier, requesting a number of packets from the one of the plurality of temporary data structures associated with the packet destination by the virtual serialization queue, wherein the number of packets is limited by an attack control parameter associated with the virtual serialization queue, and forwarding the number of packets to the virtual serialization queue.

16 Claims, 6 Drawing Sheets

U.S. PATENT DOCUMENTS

| | | | |
|---|---|---|---|
| 7,257,815 B2 * | 8/2007 | Gbadegesin et al. | 718/104 |
| 7,260,102 B2 | 8/2007 | Mehrvar et al. | |
| 7,313,142 B2 | 12/2007 | Matsuo et al. | |
| 7,502,884 B1 * | 3/2009 | Shah et al. | 710/316 |
| 2002/0052972 A1 | 5/2002 | Yim | |
| 2003/0037154 A1 | 2/2003 | Poggio et al. | |
| 2003/0065676 A1 * | 4/2003 | Gbadegesin et al. | 707/104.1 |
| 2004/0215976 A1 * | 10/2004 | Jain | 713/201 |
| 2005/0129014 A1 * | 6/2005 | Lee et al. | 370/389 |
| 2005/0135243 A1 | 6/2005 | Lee et al. | |
| 2005/0138620 A1 | 6/2005 | Lewites | |
| 2005/0147032 A1 * | 7/2005 | Lyon et al. | 370/229 |
| 2006/0041667 A1 | 2/2006 | Ahn et al. | |
| 2006/0070066 A1 | 3/2006 | Grobman | |
| 2006/0174324 A1 | 8/2006 | Zur et al. | |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

METHOD AND APPARATUS FOR DYNAMICALLY ISOLATING AFFECTED SERVICES UNDER DENIAL OF SERVICE ATTACK

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" Ser. No. 11/112,367; "Method and Apparatus for Consolidating Available Computing Resources on Different Computing Devices" Ser. No. 11/112,368; "Assigning Higher Priority to Transactions Based on Subscription Level" Ser. No. 11/112,947; "Method and Apparatus for Improving User Experience for Legitimate Traffic of a Service Impacted by Denial of Service Attack" Ser. No. 11/112,629; "Method and Apparatus for Limiting Denial of Service Attack by Limiting Traffic for Hosts" Ser. No. 11/112,328; "Hardware-Based Network Interface Per-Ring Resource Accounting" Ser. No. 11/112,222; "Dynamic Hardware Classification Engine Updating for a Network Interface" Ser. No. 11/112, 934; "Network Interface Card Resource Mapping to Virtual Network Interface Cards" Ser. No. 11/112,063; "Network Interface Decryption and Classification Technique" Ser. No. 11/112,436; "Method and Apparatus for Enforcing Resource Utilization of a Container" Ser. No. 11/112,910; "Method and Apparatus for Enforcing Packet Destination Specific Priority Using Threads" Ser. No. 11/112,584; "Method and Apparatus for processing Network Traffic Associated with Specific Protocols" Ser. No. 11/112,228; and "Method and Apparatus for Enforcing Bandwidth Utilization of a Virtual Serialization Queue" Ser. No. 11/112,322.

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

With the rising popularity of offering critical services (e.g., web services, applications, identity services, mail services, etc.) on the Internet, attacks on the receiving system that offer such critical services have become relatively common. A common attack is a denial of service (DOS) attack where a sending system bombards a receiving system (i.e., host) with a large number of packets causing excessive amounts of endpoint, and possibly transit, network bandwidth (or resources) to be consumed. Such attacks are commonly referred to as packet flooding attacks. Recently, the use of source IP address spoofing during DOS attacks and the advent of distributed attack methods and tools have provided a continuing challenge in the area of DOS attack prevention.

The Internet is entirely composed of limited resources. Such limited resources as network bandwidth, processor resources, and storage capacities are all common targets for DOS attacks designed to consume enough of a host's available resources to cause some level of service disruption. One reaction to DOS attacks is to overprovision a system to handle excess loads that may be generated by the attack. However, a limit exists to the amount of limited resources that can be allocated to a system, both in terms of availability and cost. Accordingly, most of the service providers with any level of critical services on the Internet deploy various kinds of resource consumption monitors to assist in identifying when packet destinations (i.e., containers or services) are consuming excessive resources, such as network bandwidth and CPU resources, and/or subject to a DOS attack.

Attacks initiated on a single container or service, which is located on a single computer system with multiple containers and services, has the effect of disrupting all containers or services on the computer system. Consider an example where an Internet Service Provider (ISP) (e.g., Earthlink, AOL, Yahoo, etc.) hosts multiple websites on the same physical computer system by establishing several containers, which are virtual application environments. If only one of the websites hosted on the same computer system is under a DOS attack, then the entire computer system grinds to a halt and all other containers on the same computer system suffer. Customers running multiple services on the same machine are faced with the same problem. For example, if a customer runs a http and a https based service on the same computer system and a DOS attack is initiated against just one service, all services on that computer system grinds to a halt.

SUMMARY

In general, in one aspect, the invention relates to a method for controlling consumption of resources by a packet destination. The method comprises receiving a plurality of packets from a network, identifying the packet destination consuming greater than a pre-determined amount of resources to process the plurality of packets, analyzing each of the plurality of packets by a classifier to determine to which of a plurality of temporary data structures each of the plurality of packet is forwarded, forwarding each of the plurality of packets to one of the plurality of temporary data structures as determined by the classifier, requesting a number of packets from the one of the plurality of temporary data structures associated with the packet destination by the virtual serialization queue, wherein the number of packets is limited by an attack control parameter associated with the virtual serialization queue, and wherein the virtual serialization queue is associated with the one of the plurality of temporary data structures, and forwarding the number of packets to the virtual serialization queue.

In general, in one aspect, the invention relates to a system for controlling consumption of resources by a packet destination. The system comprises a network interface configured to receive a plurality of packets from a network, a resource consumption monitor configured to identify the packet destination consuming greater than a pre-determined amount of resources to process the plurality of packets, a classifier operatively connected to the network interface configured to analyze each of the plurality of packets and determine to which of a plurality of temporary data structures each of the plurality of packet is forwarded, the plurality of temporary data structures configured to receive packets from the classifier, wherein each of the plurality of temporary data structures is associated with at least one virtual serialization queue, and the at least one virtual serialization queue, wherein the at least one virtual serialization queue is configured to retrieve and queue a number of packets from the one of the plurality of temporary data structures associated with the packet destination, wherein the number of packets is limited by an attack control parameter associated with the virtual serialization queue, and wherein the virtual serialization queue is associated with the one of the plurality of temporary data structures.

Other aspects of the invention will be apparent from the following description and the appended claims.

DETAILED DESCRIPTION

Figure 1A:
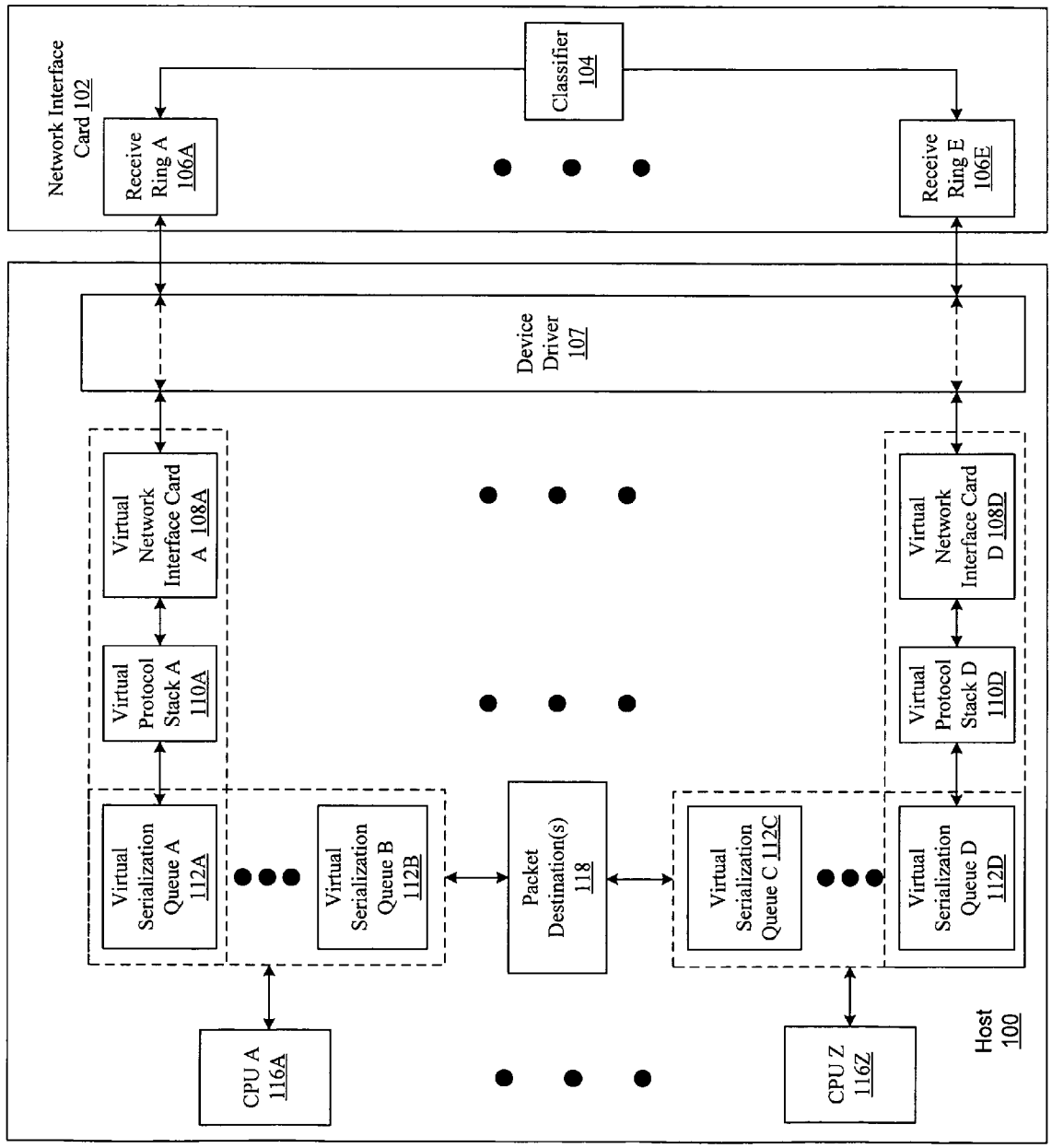
FIGS. 1A and 1B show a system in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for controlling consumption of resources by a packet destination. More specifically, embodiments of the invention relate to a method and apparatus for enforcing priority control for a packet destination consuming an abnormally large amount of resources while allowing other packet destinations (e.g., containers, services, etc.) on the same computer system to continue with little or no effect on performance.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing.

In one embodiment of the invention, the NIC (102) includes a classifier (104) and one or more receive rings (106A, 106D, 106E). In one embodiment of the invention, the receive rings (106A, 106D, 106E) correspond to portions of memory within the NIC (102) used to temporarily store the received packets. Further, in one embodiment of the invention, a ring element of the receive rings (106A, 106D, 106E) may point to host memory. In one embodiment of the invention, the classifier (104) is configured to analyze the incoming network traffic, typically in the form of packets, received from the network (not shown).

In one embodiment of the invention, analyzing individual packets includes determining to which of the receive rings (106A, 106D, 106E) each packet is forwarded. In one embodiment of the invention, analyzing the packets by the classifier (104) includes analyzing one or more fields in each of the packets to determine to which of the receive rings (106A, 106D, 106E) the packets are forwarded. As an alternative, the classifier (104) may use the contents of one or more fields in each packet as an index into a data structure that includes information necessary to determine to which receive ring (106A, 106D, 106E) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the host (100) may include the following components: a resource consumption monitor (not shown), a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more packet destinations (118) (e.g., containers and/or services). In one embodiment of the invention, the resource consumption monitor (not shown) is configured to identify a packet destination consuming greater than a predetermined amount of resources to process the plurality of packets. In one embodiment of the invention, the TCP/IP stack acts as the resource consumption monitor and dynamically identifies that a particular service or container is under attack or is consuming more than a pre-determined amount of network bandwidth and CPU resources. The pre-determined amount may be set arbitrarily by the system administrator or may be generated based on actual usage data over a period of time, which continues to be tuned.

In one embodiment of the invention, the device driver (107) provides an interface between the receive rings (106A, 106D, 106E) and the host (100). More specifically, the device driver (107) exposes the receive rings (106A, 106E, 106K) to the host (100). In one embodiment of the invention, each of the virtual NICs (108A, 108D) is associated with one or more receive rings (106A, 106D, 106E). The virtual NICs (108A, 108D) provide an abstraction layer between the NIC (102) and the various packet destinations (118) (e.g., containers and/or services) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more ports, and configured to handle one or more protocol types. Thus, while the host (100) may be operatively connected to a single NIC (102), packet destinations (118) (e.g., containers and/or services) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (100) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to containers, services (e.g., web server), etc.

Figure 1B:
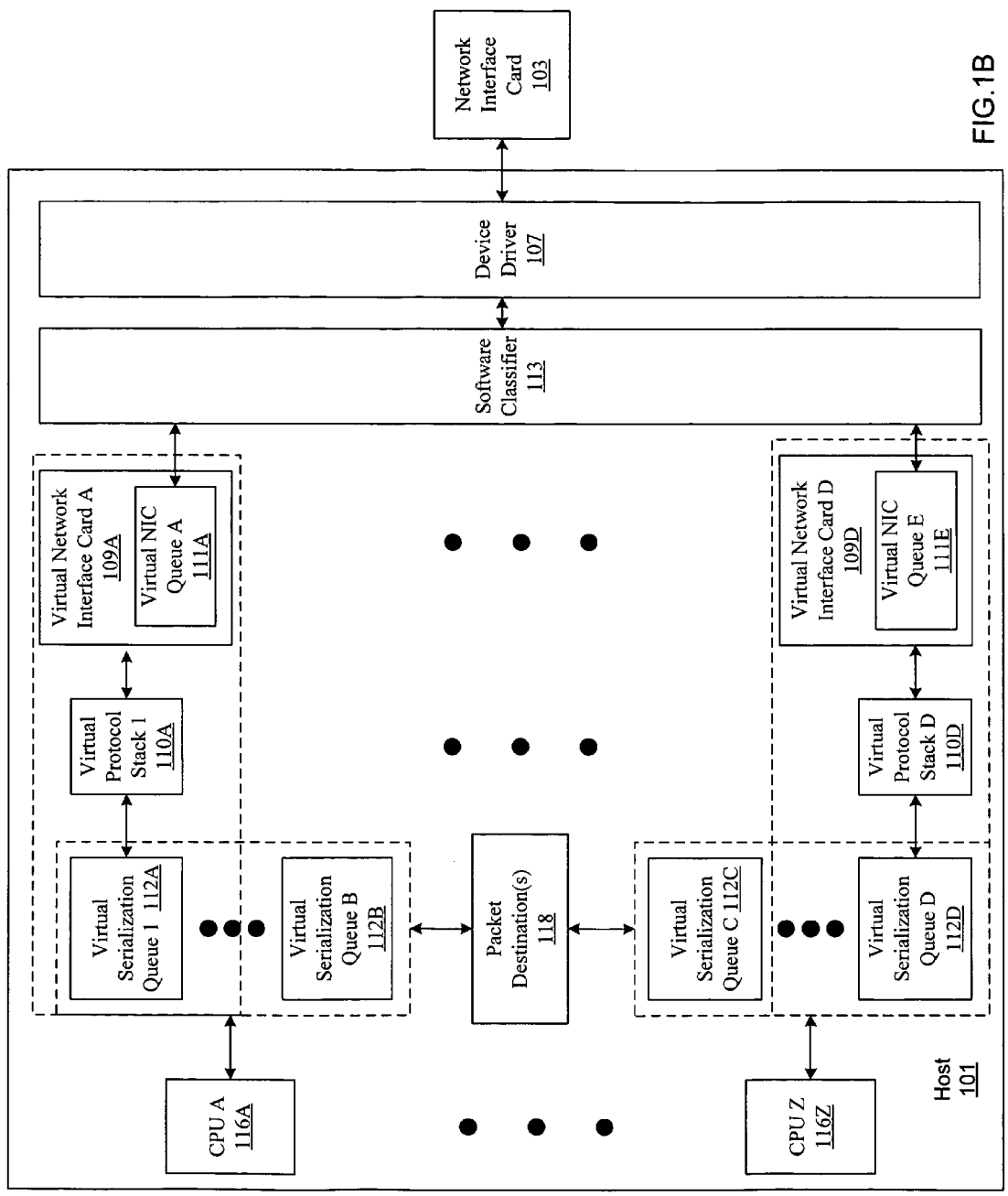

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: a resource consumption monitor (not shown) a device driver (105), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one packet destination (118) (e.g., containers and/or services). In one embodiment of the invention, the software classifier (113) is configured to analyze the incoming network traffic, typically in the form of packets, received from the network (not shown).

In one embodiment of the invention, the resource consumption monitor (not shown) is configured to identify a packet destination consuming greater than a pre-determined amount of resources to process the plurality of packets. In one embodiment of the invention, the TCP/IP stack acts as the resource consumption monitor and dynamically identifies that a particular service or container is under attack or is consuming more than a pre-determined amount of network bandwidth and CPU resources. The pre-determined amount may be set arbitrarily by the system administrator or may be generated based on actual usage data over a period of time, which continues to be tuned.

In one embodiment of the invention, the purpose of classifying the packets is to determine to which of the virtual NIC queues (111A, 111D, 111E) each of the packets is forwarded. In one embodiment of the invention, the virtual NIC queues (111A, 111D, 111E) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D, 111E) each of the packets is forwarded. As an alternative, the software classifier (113) may use the contents of one or more fields in each packet as an index into a data structure that includes information necessary to determine which virtual NIC queue (111A, 111D, 111E) each of the packets is forwarded.

As shown in FIG. 1B, the device driver (105) is operatively connected to the software classifier (113) and provides an interface between the NIC (103) and the host (101). In one embodiment of the invention, each of the virtual NICs (109A, 109D) includes one or more virtual NIC queues (111A, 111D, 111E). The virtual NICs (109A, 109D) provide an abstraction layer between the NIC (103) and the various packet destinations (118) (e.g., containers and/or services) executing on the host (101). More specifically, each virtual NIC (109A, 109D) operates like a NIC (101). For example, in one embodiment of the invention, each virtual NIC (109A, 109D) is associated with one or more Internet Protocol (IP) addresses, one or more ports, and configured to handle one or more protocol types. Thus, while the host (101) may be operatively connected to a single NIC (103), the host (101) (or more specifically, packet destinations (118) (e.g., containers and/or services) (at both the kernel level and the user-level) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (101) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to, containers, services (e.g., web server), etc. In one embodiment of the invention, each packet destination (118) (e.g., containers and/or services) may be associated with one or more virtual serialization queues (112A, 112B, 112C, 112D).

Figure 2:
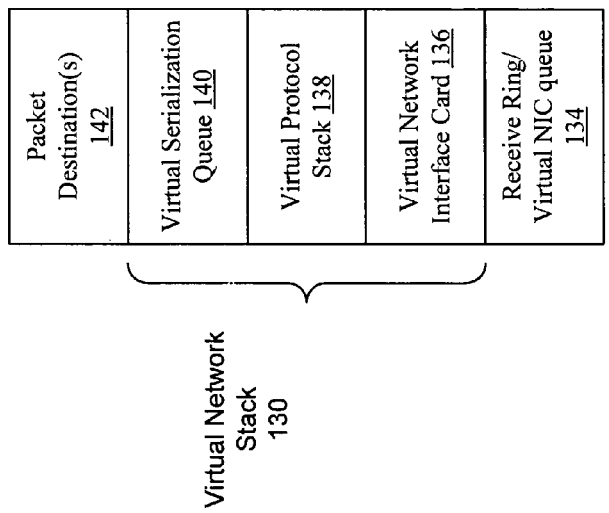
FIG. 2 shows a virtual network stack in accordance with one embodiment of the invention.

In one embodiment of the invention, the receive rings and the virtual NIC queues may be generally referred to as temporary data structures. Further, in one embodiment of the invention, a system, as shown in FIGS. 1 and 2, may include multiple hosts (such as host (100) in FIG. 1 and host (101) in FIG. 2) where each host is operatively connected to one or more NICs. In one embodiment of the invention, each of the NICs may correspond to the NIC shown in FIG. 1 (i.e., NIC (102)) or the NIC shown in FIG. 1B (i.e., NIC (103)). Thus, in a given system, one host may include a software classifier while another host may be connected to a NIC with a hardware classifier. In this scenario, the host would be configured to support both implementations, as described above with in FIGS. 1A and 1B.

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack (138), and a virtual serialization queue (140). In one embodiment of the invention, the virtual network stack (130) may be bound to one or more receive rings or virtual NIC interfaces (134) (depending on the implementation). Further, the virtual network stack (130) may be bound to one or more packet destinations (142) (e.g., containers and/or services). All of the aforementioned components in the virtual network stack (130) are bound together such that a packet received by the virtual NIC (136) of a particular virtual network stack (130) is forwarded through the other components of the virtual network stack (130) until the packet reaches the packet destination (142) (e.g., containers and/or services) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
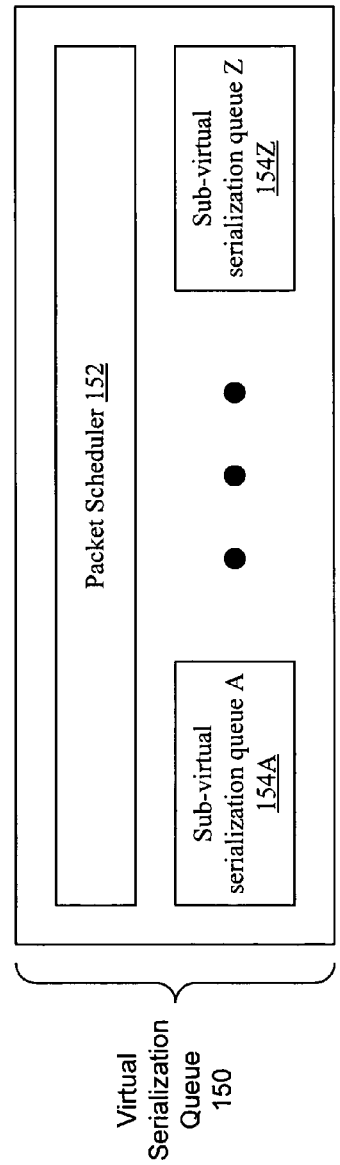
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) are associated, is also associated with a corresponding number of receive rings and/or virtual NIC queues (depending on the implementation). Thus, each of the sub-virtual serialization queues (154A, 154Z) are bound to one of the aforementioned receive rings and/or virtual NIC queues (depending on the implementation). Thus, when the virtual serialization queue (150) receives packets from one or more associated receive rings or a virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, each of the sub-virtual serialization queues (154A, 154Z) includes a pair of FIFO queues, namely an inbound queue and an outbound queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (150) may include functionality to support both fair-share scheduling and time-sharing scheduling with respect to processing of the packets queued on the sub-virtual serialization queues (154A, 154Z). Further, the packet scheduler (150) may also be configured to schedule packet processing based on the priority associated with each of the sub-virtual serialization queues (154A, 154Z).

Figure 4:
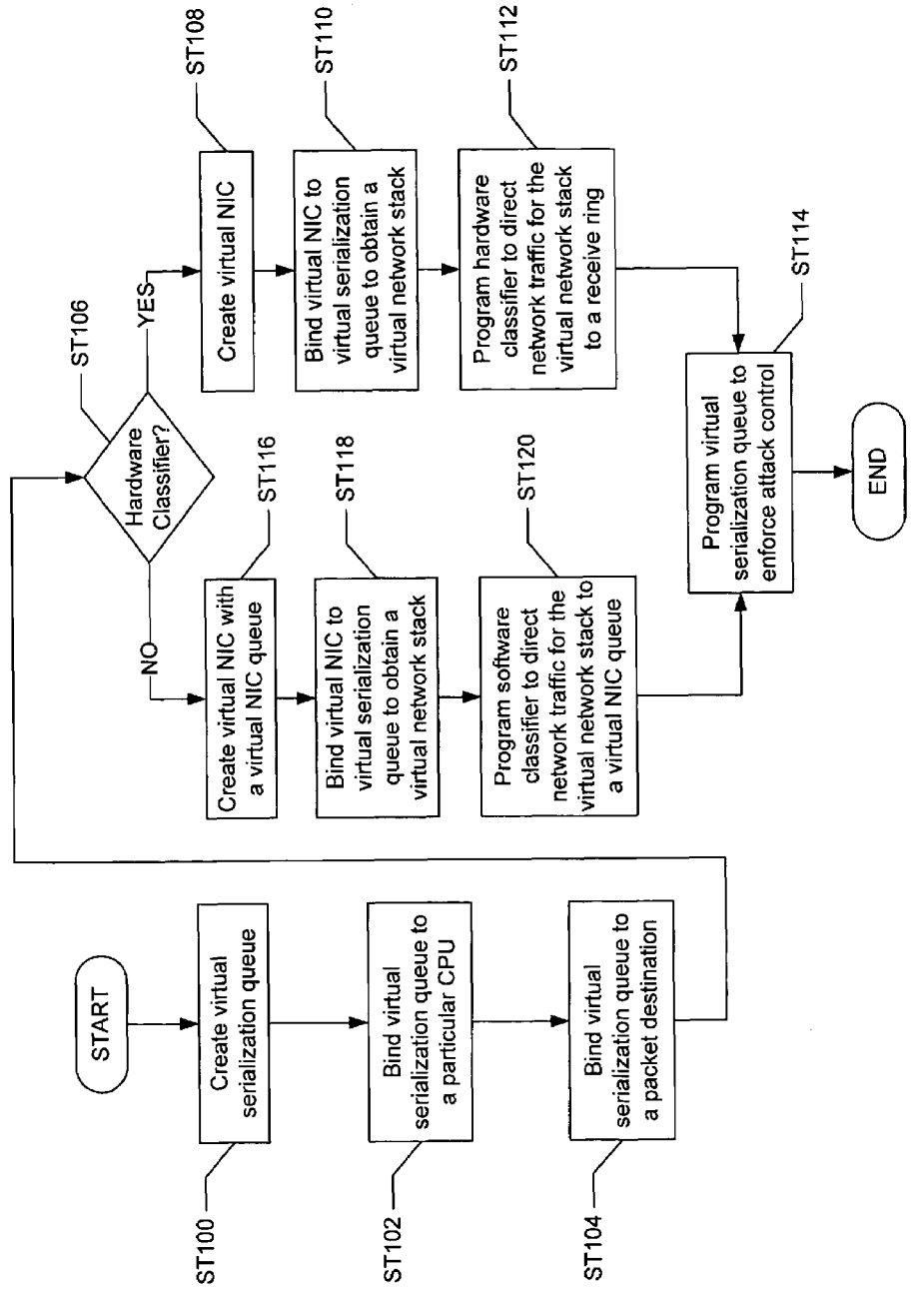
FIGS. 4 and 5 show flowcharts in accordance with one embodiment of the invention.

FIG. 4 shows a flowchart in accordance with one embodiment of the invention. Initially, a virtual serialization queue is created (ST 100). In one embodiment of the invention, creating the virtual serialization queue may include specifying one or more sub-virtual serialization queues and configuring the packet scheduler. The virtual serialization queue is subsequently bound to a CPU on the host (ST102). Those skilled in the art will appreciate that the virtual serialization queue created in ST100 may be implicitly bound to a CPU upon creation.

At this stage, the virtual serialization queue is bound to a packet destination (e.g., containers and/or services) (ST104). Those of ordinary skill in the art will appreciate that the packet destination (e.g., containers and/or services) may be bound to the virtual serialization queue any time after the virtual serialization queue has been created.

A determination is now made whether a NIC associated with the host includes a hardware classifier (ST106). If the NIC includes a hardware classifier, then a virtual NIC is created (ST108) and bound to the virtual serialization queue created in ST100 to obtain a virtual network stack (ST110). The hardware classifier is subsequently programmed so that network traffic for the virtual network stack created in ST110 is directed to a particular receive ring by the hardware classifier (ST112). The virtual serialization queue created in ST100 is programmed to enforce attack control (i.e., DOS attack) (ST114). In one embodiment of the invention, programming the virtual serialization to enforce attack control includes specifying an attack control parameter for the virtual serialization queue. In one embodiment of the invention, the attack control parameter specifies the maximum number of packets that may be processed by the virtual serialization queue over a specific time period (e.g., number of packets that may be processed by the specific virtual serialization queue per second). Alternatively, the attack control parameter may specify the maximum number of bytes of data that may be processed by the virtual serialization queue in a specific time period. Furthermore, the attack control parameter may specify an amount of CPU resources that may be processed by the virtual serialization queue in a specific time period.

Continuing the discussion of FIG. 4, if the NIC does not include a hardware classifier (i.e., the scenario in which the host includes a NIC having a software classifier), then a virtual NIC with a virtual NIC queue is created (ST116) and bound to the virtual serialization queue created in ST100 to obtain a virtual network stack (ST118). The software classifier is then programmed so that network traffic for the virtual network stack created in ST110 is directed to a particular virtual NIC queue by the software classifier (ST120). The method then proceeds to ST114.

Those skilled in the art will appreciate that the steps shown in FIG. 4 may be repeated as required to create any number of virtual network stacks. Once the virtual network stack(s) has been created, as described above, the host may proceed to receive packets from the network. Those skilled in the art will appreciate that the number of virtual network stacks created using the steps shown in FIG. 4 may vary based on the available system resources (e.g., number of CPUs, type of NIC, etc.)

Figure 5:
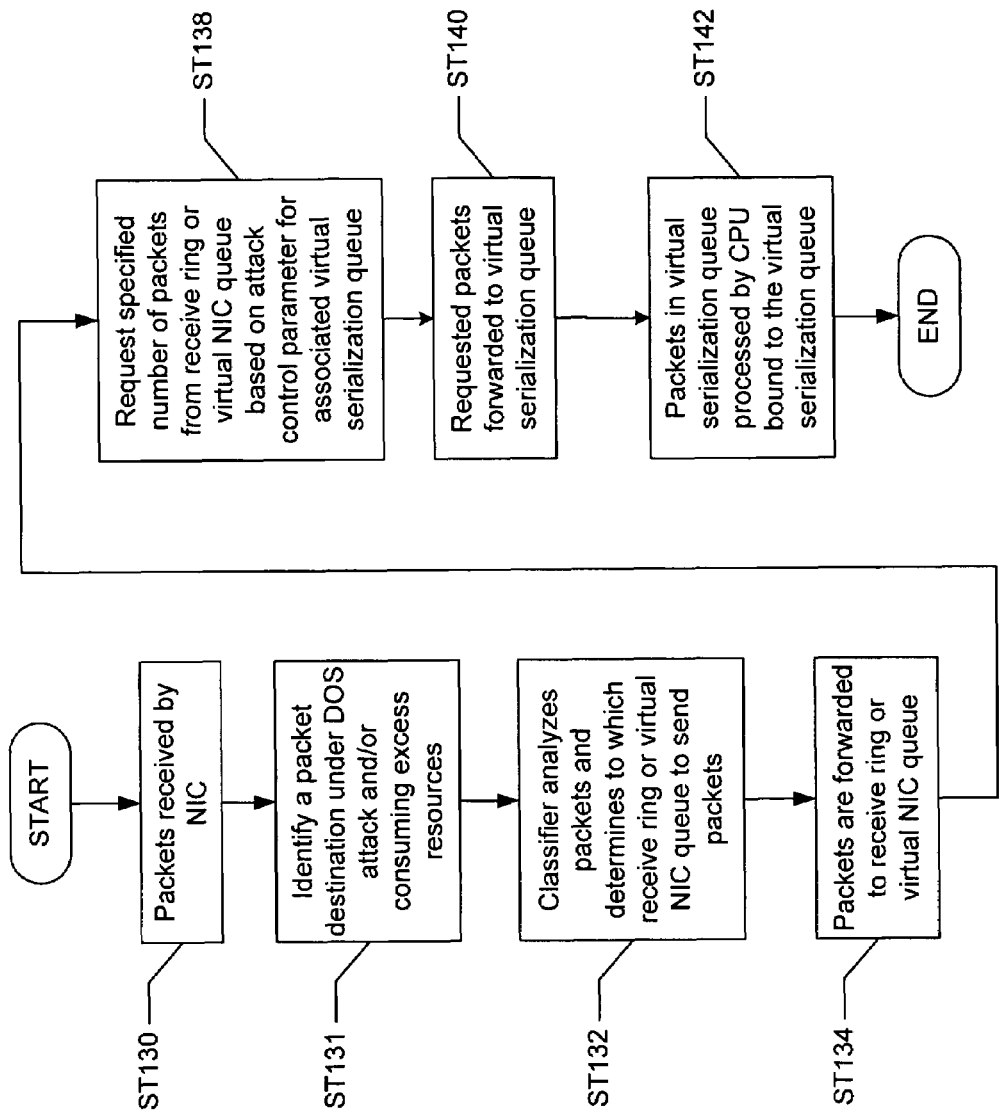

FIG. 5 shows a flowchart in accordance with one embodiment of the invention. Initially, one or more packets are received by the NIC (ST130). In one embodiment of the invention, a packet destination under DOS attack and/or consuming excess resources is identified. (ST131). This identification process involves the TCP/IP stack dynamically identifying a spike in resource consumption by the packet destination. A classifier (either a hardware classifier residing in the NIC or a software classifier residing in the host operatively connected to the NIC) analyses each packet and determines which of the receive rings (if the classifier is a hardware classifier) or virtual NIC queues (if the classifier is a software classifier) to forward each of the packets (ST132). The packets are subsequently forwarded to the appropriate receive ring (if the classifier is a hardware classifier) or virtual NIC queue (if the classifier is a software classifier) as determined by the classifier (ST134). At this stage, the processing of the packets differs depending on which mode the virtual serialization queue (which is bound to the receive ring or virtual NIC queue via the stack) is operating in. Specifically, the processing of the packets depends on whether the virtual serialization queue is operating in polling mode or interrupt mode (ST136).

The packets remain in the receive ring or virtual NIC queue (depending on the implementation) until the virtual serialization queue requests a specified number of packets from the receive ring or virtual NIC queue based on the attack control parameter (discussed above) (ST138). In other words, if the packet destination is under attack or is consuming more than the pre-determined amount, then the number of packets pulled up to the packet destination (and eventually into memory) is limited. The requested number of packets is then forwarded to the virtual serialization queue (ST140). In one embodiment of the invention, the virtual serialization queue does not request any packets when there are packets already queued on the virtual serialization queue. Those skilled in the art will appreciate that the once the virtual serialization queue receives the packets from the receive ring or virtual NIC queue, the virtual serialization queue may place each of the packets in an appropriate sub-virtual serialization queue based on the results of the classifier analysis in ST132.

Those skilled in the art will appreciate the virtual serialization queue may operate without using an attack control parameter. Thus, if no attack control parameter is specified, then all packets for the particular virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues are receiving packets at a faster rate than the corresponding virtual serialization queue is requesting packets, the receive rings and/or virtual NIC queues fill with packets and packets received after this point are dropped until packets on the receive rings and/or virtual NIC queues are requested and processed. In one embodiment of the invention, packets for an offending packet destination (i.e., those that consume too many resources) are dropped, if necessary, without consuming any resources or any processing, so the unaffected packet destinations continue working with minimal impact.

Once the packets are placed on the virtual serialization queue the packets are processed by the CPU bound to the particular virtual serialization queue (ST142). In one embodiment of the invention, the specific order in which the packets in a particular sub-virtual serialization queue are processed is determined by the packet scheduler.

Figure 6:
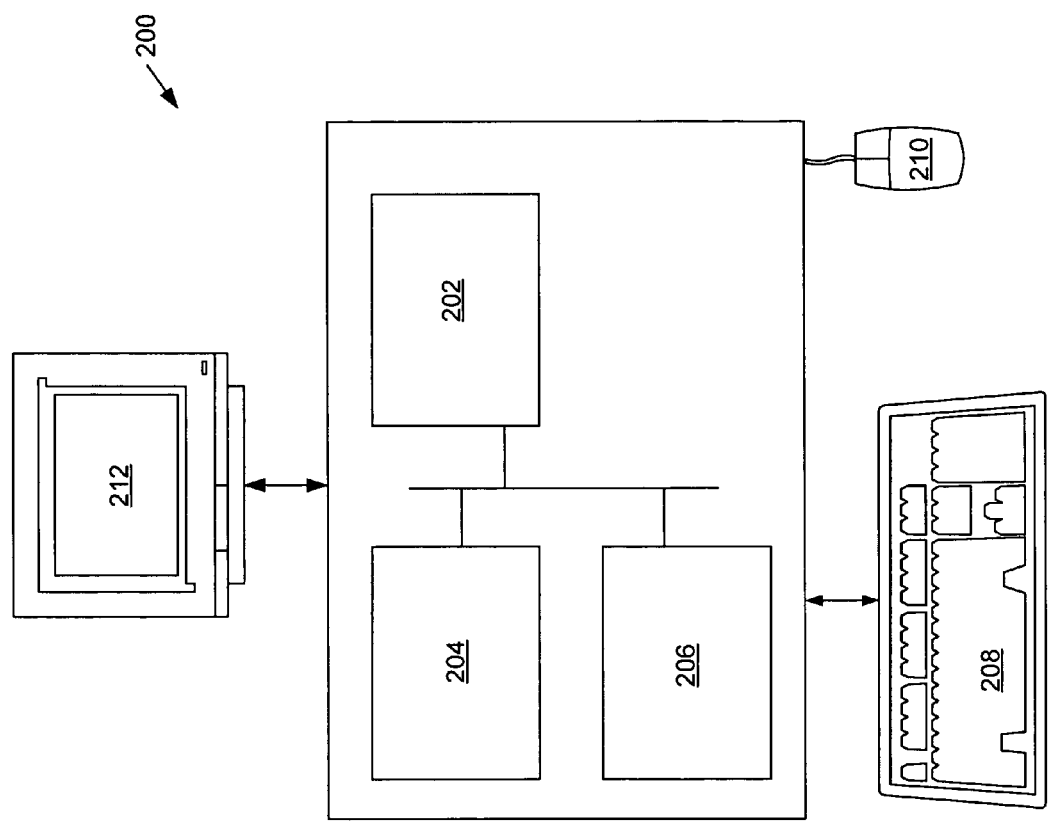
FIG. 6 shows a computer system in accordance with one embodiment of the invention.

An embodiment of the invention may be implemented on virtually any type of computer regardless of the platform being used. For example, as shown in FIG. 6, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

In one embodiment of the invention, multiple services and containers may run on the same computer system without impacting each other. In one embodiment of the invention, a denial of service attack against one particular service or container has a minimal impact on other services or containing running on the same computer system. Because various network traffic types are distributed out in the NIC and individual CPUs can be applied to each service, the invention provides increased performance in terms of throughput and processing speed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for controlling consumption of resources by packet destinations comprising:
    receiving, from a physical network interface card (NIC), a plurality of packets from a network, wherein the physical NIC is operatively connected to a host;
    identifying a packet destination of a plurality of packet destinations consuming greater than a pre-determined amount of resources to process the plurality of packets, wherein the plurality of packet destinations is located on the host;
    analyzing each of the plurality of packets by a classifier to determine to which of a plurality of temporary data structures each of the plurality of packets is forwarded, wherein the classifier is located in the physical NIC;
    forwarding each of the plurality of packets to one of the plurality of temporary data structures as determined by the classifier, wherein the temporary data structure is located on the physical NIC;
    requesting, using a polling mode, a number of packets from the one of the plurality of temporary data structures associated with the packet destination by a virtual serialization queue located on the host, wherein the virtual serialization queue is associated with the packet destination, wherein the number of packets requested is limited by an attack control parameter associated with the virtual serialization queue, and wherein the virtual serialization queue is associated with the one of the plurality of temporary data structures; and
    forwarding the number of packets to a virtual network interface card (VNIC) bound to the virtual serialization queue, wherein the VNIC is one of a plurality of VNICs on the host, wherein each VNIC is associated with a different IP address.

2. The method of claim 1, wherein the packet destination is at least one selected from the group consisting of a container and a service.

3. The method of claim 1, wherein the predetermined amount of resources refers to at least one selected from the group consisting of network bandwidth and processor resources.

4. The method of claim 1, wherein the packet destination consuming greater than the pre-determined amount of resources results from a denial of service attack.

5. The method of claim 1, further comprising:
    processing the number of packets on the virtual serialization queue using a central processing unit bound to the virtual serialization queue.

6. The method of claim 1, wherein the attack control parameter specifies a maximum number of packets that may be retrieved from the one of the plurality of temporary data structures associated with the virtual serialization queue in a specified period of time.

7. The method of claim 1, wherein the attack control parameter specifies a maximum number of bytes that may be retrieved from the one of the plurality of temporary data structures associated with the packet destination in a specified period of time.

8. The method of claim 1, wherein the virtual serialization queue comprises at least one sub-virtual serialization queue and a packet scheduler.

9. A system for controlling consumption of resources by packet destinations comprising:
    a physical network interface configured to receive a plurality of packets from a network, wherein the physical network interface is operatively connected to a host;
    a resource consumption monitor executing on the host and configured to identify, from a plurality of packet destinations, a packet destination consuming greater than a pre-determined amount of resources to process the plurality of packets, wherein the plurality of packet destinations is located on the host;
    a classifier located on the physical network interface and configured to analyze each of the plurality of packets and determine to which of a plurality of temporary data structures each of the plurality of packet is forwarded;
    the plurality of temporary data structures located on the physical network interface and configured to receive packets from the classifier, wherein each of the plurality of temporary data structures is associated with at least one virtual network interface card (VNIC) and wherein the at least one VNIC is bound to at least one virtual serialization queue on the host, wherein the VNIC is one of a plurality of VNICs on the host, wherein each VNIC is associated with a different IP address; and
    the at least one virtual serialization queue located on the host configured to retrieve a number of packets, using the at least one VNIC, from the at least one of the plurality of temporary data structures and queue the number of received packets, wherein the number of packets are requested using a polling mode, wherein the number of packets is limited by an attack control parameter associated with the virtual serialization queue, and wherein the virtual serialization queue is associated with the packet destination.

10. The system of claim 9, wherein the packet destination is at least one selected from the group consisting of a container and a service.

11. The system of claim 9, wherein the predetermined amount of resources refers to at least one selected from the group consisting of network bandwidth and processor resources.

12. The system of claim 9, wherein the packet destination consuming greater than the pre-determined amount of resources results from a denial of service attack.

13. The system of claim 9, wherein the at least one virtual serialization queue is associated with a virtual network stack.

14. The system of claim 9, wherein the attack control parameter specifies a maximum number of packets that may be retrieved from the one of the plurality of temporary data structures associated with the packet destination in a specified period of time.

15. The system of claim 9, wherein the attack parameter specifies a maximum number of bytes that may be retrieved from the one of the plurality of temporary data structures associated with the packet destination in a specified period of time.

16. The system of claim 9, wherein the at least one virtual serialization queue comprises at least one sub-virtual serialization queue and a packet scheduler.

* * * * *